(12) United States Patent
Waldron et al.

(10) Patent No.: US 9,364,116 B2
(45) Date of Patent: Jun. 14, 2016

(54) MODULAR BEVERAGE MAKING AND DISPENSING APPARATUS

(71) Applicant: MODBAR, LLC, Fort Wayne, IN (US)

(72) Inventors: Corey Waldron, Fort Wayne, IN (US); Aric Forbing, Fort Wayne, IN (US)

(73) Assignee: Modbar, LLC, Fort Wayne, IN (US)

( * ) Notice: Subject to any disclaimer, the term of this patent is extended or adjusted under 35 U.S.C. 154(b) by 124 days.

(21) Appl. No.: 13/861,190

(22) Filed: Apr. 11, 2013

(65) Prior Publication Data
US 2014/0305313 A1   Oct. 16, 2014

(51) Int. Cl.
A47J 31/46    (2006.01)

(52) U.S. Cl.
CPC .............. *A47J 31/46* (2013.01); *A47J 2201/00* (2013.01)

(58) Field of Classification Search
CPC ..... A47J 31/007; A47J 31/4489; A47J 31/46; A47J 31/52; A47J 31/542; A47J 31/56
USPC ........ 99/280, 281, 323.3, 282–283, 292, 294, 99/297, 299; 137/259, 341; 251/122, 251/126.15, 128.04
See application file for complete search history.

(56) References Cited

U.S. PATENT DOCUMENTS

| | | | | |
|---|---|---|---|---|
| 1,473,898 A | * | 11/1923 | Bossini | 99/294 |
| 3,795,788 A | | 3/1974 | Perucca | |
| 4,757,752 A | | 7/1988 | Robins et al. | |
| 4,790,239 A | * | 12/1988 | Hewitt | 99/279 |
| 4,947,738 A | | 8/1990 | Eugster | |
| 5,357,848 A | | 10/1994 | Eugster et al. | |
| 5,372,061 A | * | 12/1994 | Albert et al. | 99/281 |
| 5,551,331 A | | 9/1996 | Pfeifer et al. | |
| 5,644,972 A | * | 7/1997 | Dahmen et al. | 99/280 |
| 5,778,765 A | | 7/1998 | Klawuhn et al. | |
| 6,561,079 B1 | | 5/2003 | Muller et al. | |
| 8,656,826 B2 | * | 2/2014 | Bianchi et al. | 99/281 |
| 8,880,427 B1 | * | 11/2014 | Jones | 705/22 |
| 2009/0126577 A1 | * | 5/2009 | Ternite | 99/295 |
| 2014/0069279 A1 | * | 3/2014 | Upston et al. | 99/283 |

FOREIGN PATENT DOCUMENTS

AU       2005101006 A4 *  2/2006
WO    WO 2011135479 A1 * 11/2011

* cited by examiner

*Primary Examiner* — Tu B Hoang
*Assistant Examiner* — Kristopher Reichlen
(74) *Attorney, Agent, or Firm* — Christensen O'Connor Johnson Kindness PLLC (57) ABSTRACT

A modular beverage brewing apparatus comprising a removable hot water producing module, a removable pressurized hot water producing module, and a removable steam producing module all connected to a remote dispensing liquid beverage dispensing unit.

16 Claims, 9 Drawing Sheets

MODULAR BEVERAGE MAKING AND DISPENSING APPARATUS

BACKGROUND

1. Field

The present disclosure relates to brewing units such as those used to produce coffee, espresso, tea and the like.

2. Description of the Prior Art

Various machines for brewing beverages are known in the art. Such machines provide a single function such as providing hot water for tea, pressurized hot water that is then forced through coffee grounds for making coffee, or steam for frothing milk or making espresso. Some known machines provide a combination of two or three of these functions.

An example of a prior art brewing device is disclosed in U.S. Pat. No. 3,795,788, to Perucca (the "788 patent"). The '788 patent discloses a coffee brewing machine having a heat exchanger for alternatively producing steam or unpressurized hot water. The machine further comprised a valve to control the flow of water and a thermostatic temperature control. However, among other missing elements, the '788 patent does not discloses a remote dispensing device for hot water, pressurized hot water, and steam. Nor does the '788 patent disclose a modular system for providing the same.

A second prior art device is disclosed by U.S. Pat. No. 4,757,752 to Robins et al. (the "'752 patent"). The '752 patent discloses a tea brewing and dispensing machine comprising a means for heating a non-pressurized stream of water that thereafter passes through a bed of tea leaves to produce tea. The '752 patent, however, does not disclose multiple dispensing paths, a remote dispensing unit, or a steam or pressurized water units.

U.S. Pat. No. 4,947,738, to Eugster (the "738 patent"), discloses a hot beverage making machine comprising a ceramic multi-way valve. The '738 patent does not disclose a modularity or a remote dispensing unit.

U.S. Pat. No. 5,357,848 to Eugster (the "'848 patent"), discloses a coffee machine having a multiple flow streams, but it does not disclose multiple removable modules or a remote dispensing unit connected to such modules.

Another prior art device, U.S. Pat. No. 5,551,331, to Pfeifer et al. (the "'331 patent"), discloses an espresso apparatus having a brew head in fluid communication with a heat exchanger. The '331 patent does not disclose a modular design or a remote dispensing unit.

Prior art device, U.S. Pat. No. 5,372,061, to Albert et al. (the "'061 patent"), discloses yet another an espresso machine; however, it too fails to disclose a remote dispensing unit or removable modular components for steam and water.

U.S. Pat. No. 5,778,765 to Klawuhn et al. (the "'765 patent") discloses another prior art beverage brewing apparatus having a multiway valve, but it does not disclose multiple removable modular units for steam and hot water production. Moreover, it does not disclose a remove dispensing unit for beverages.

Yet another prior art disclosure comes from U.S. Pat. No. 6,561,079, to Muller et al. (the "'079 patent"). The '079 patent discloses a steam generating device for frothing liquids but it does not disclose providing hot water, pressurized hot water, and steam from a single device or modular removable components.

Thus, although many beverage brewing devices are disclosed in the prior art, none of the prior art discloses a beverage brewing device having a modular removable unit that produce steam, hot water, and pressurized hot water, respectively.

The prior art also fails to disclose teach or suggest beverage brewing device having a remote dispensing unit, a control system for managing fluid flow rates to a steam dispensing unit, a variable pressure delivery system, or a valve actuated steam dispensing unit.

SUMMARY

The present disclosure relates to a system and apparatus for making and dispensing beverages.

There are numerous types of beverage dispensers that may benefit from the present disclosure, for example, coffee brewers, tea brewers or beverage concentrate dispensers. More particularly, any beverage dispenser that produces more than one beverage from different outlet ports or produces one beverage from multiple outlet ports may benefit from the present disclosure.

Beverage dispensers such as those mentioned above may be constructed with an overhanging portion which protrudes horizontally from an upper portion of a main structure or body of the beverage dispenser. The overhanging portion contains one or more outlet ports from which a beverage is dispensed.

Briefly, a modular beverage brewing apparatus is disclosed. The apparatus comprises a removable hot water producing module, a removable pressurized hot water producing module, and a removable steam producing module all connected to a remote dispensing liquid beverage dispensing unit.

Advantageously, the design of the present disclosure allows for convenient service and/or upgrades of each beverage module without disrupting the use of the beverage brewing apparatus or its associated business purpose.

The present system advantageously provides steam on an as needed basis to steam dispensing device and ultimately to steam wand. Thus, the steam channel is not needlessly saturated when not in use. The present design therefore significantly reduces the need to "purge" the steam line prior to foaming milk, for example. This gives users of the present invention a much better turn-around time for making beverages. The lack of constant line saturation can also provide for improved component life.

Additional features will become apparent to those skilled in the art upon consideration of the following drawings, descriptions, and claims herein.

According to a first aspect, the present invention provides a beverage making and dispensing apparatus, comprising:
- a first module connected to a water supply and a power source for producing hot water;
- a second module connected to a water supply and a power source for producing pressurized hot water;
- a third module connected to a water supply and a power source for producing steam,
- wherein each module is fluidly connected to a remote dispensing unit; and
- wherein said remote dispensing unit comprises: a hot water delivery device; a pressurized hot water delivery device; and a steam delivery device.

The remote dispensing unit, in some embodiments, is removable.

In embodiments, the remote dispensing unit is located on a counter surface and the first, second and third modules are located under said counter surface.

In embodiments, the beverage apparatus further comprises at least one electronic control device in electronic communication with at least one of said first module, second module and third module, and at least one electronic input device in electronic communication with said at least one electronic control device, wherein said electronic control device accepts input from said first module, second module and third module and provides output instructions to said first module, second module and third module.

In embodiments, the third module comprises a water inlet, a solenoid valve, a steam boiler, a temperature sensor and a fill level sensor, wherein said water inlet is in fluid connection with solenoid valve, wherein solenoid valve is electronically connected to said electronic control device so that said electronic control device can regulate flow of water through said solenoid valve based on inputs from said electronic input device, as well as said temperature sensor and said fill level sensor of said steam boiler.

The beverage apparatus may further comprise a heating element, wherein said electronic control device receives feedback inputs from said fill level sensor and said temperature sensor and provides control signals to said heating element.

The beverage apparatus may further comprise a steam valve which is electronically connected to said electronic control device, wherein said steam valve is of the three way type, wherein upon actuation of said steam valve a steam delivery tube is open to flow of steam from steam boiler, mechanically attached to steam valve.

In embodiments, the beverage apparatus further comprises a micro switch in electronic communication with said steam valve, wherein when open, micro switch instructs said steam boiler to supply steam to said steam delivery device via a fluid connection tube for flow of steam through a steam channel and ultimately out of a steam wand.

Preferably, the fluid connection tube has a first end attached to the electronically controlled valve and a second end attached to a mechanically controlled needle valve, wherein the apparatus further comprises means to open the mechanical valve and activate a switch, and further comprises an outlet port fluidly connected to said mechanically controlled needle valve.

The steam wand may comprise an inner tube in communication with a steam path, a secondary outer tube which is not in communication with steam path, so that a separation of space occurs between said inner and outer tubes, and an insulating material placed between the inner tube and the outer tube to provide a thermal barrier between the steam path and said outer tube.

In embodiments, the second module comprises flow meter, pump, motor, first boiler, second boiler, heating elements, temperature sensors and solenoid valve, wherein said second module is electrically connected to said electronic input device which is in electronic communication with said at least one electronic control device.

Preferably, the at least one electronic control device is further in electronic communication with said flow meter so that said flow meter provides flow rate information to said at least one electronic control device so that said at least one electronic control device can appropriately control pump.

In embodiments, the electronic input device is configured to accept a desired output temperature for water, wherein temperature sensors from boilers feedback temperature information to said at least one electronic control device, which is in electronic communication with heating elements of boilers, thereby controlling the temperature of water as it leaves each boiler via each respective fluid path.

The pressurized hot water delivery device may comprise means to control the temperature of fluid delivered from a brew head to dispensing point, wherein said brew head comprises a heating element and a temperature sensor attached to said brewing head, wherein said heating element and temperature sensor are further in wireless or wired electronic communication with said at least one electronic control device such that said at least one electronic control device can further adjust the temperature of water entering brew head and provide fine temperature adjustment directly at brew head.

The pressurized hot water delivery device may comprise means to control the pressure of fluid delivered from second module to dispensing point, wherein said brew head further comprises pressure transducer, potentiometer, and actuator/switches in wired or wireless electronic communication with said at least one electronic control device such that said at least one electronic control device can further adjust the pressure of water entering the brew head and provide fine pressure adjustment directly at brew head.

The potentiometer is preferably in direct connection to actuator switches or lever and is in wired or wireless communication with said at least one electronic control device; the at least one electronic control device receives information from potentiometer and further instructs motor to power pump at a rotation speed in direct relationship to position of potentiometer, so that a feed-back loop is provided.

In general terms, the pressurized hot water delivery device comprises a learning electronic control system, wherein the learning electronic control system comprises:
  a computerized electronic control device;
  a user activatable data storage device in electronic communication with the control device;
  at least one fluid manipulation device in electronic communication with the control device and operable to receive instructions from the control device;
  at least one sensor in electronic communication with the at least one fluid manipulation device and operable to receive information from the at least one fluid manipulation device;
  the at least one sensor in further electronic communication with the control device and operable to send information to the control device;
  the at least one sensor in further electronic communication with the data storage device, wherein the data storage device is operable to receive information from the at least one sensor, store the information, and send the information to the control device; and
  a user input device selectively operable to input instructions to the control device.

The at least one sensor may be selected from the group consisting of a thermometer, a pressure transducers, a voltage transducer, a potentiometer, and a position sensor.

The at least one fluid manipulation device may be selected from the group consisting of a pump, a heater, and a flow regulator.

According to another aspect, the present invention provides a method of systematically programming beverage brewing apparatus for consistent performance, the method comprising the steps of: controlling the operation of a beverage brewing apparatus; determining a desired output; electronically monitoring the operation; memorizing the operation parameters of the apparatus while said apparatus is producing the desired output; and using the memorized parameters to control subsequent uses of the beverage brewing apparatus for example volume, time, cycle time, flow rate.

BRIEF DESCRIPTION OF THE DRAWINGS

FIG. 3A1 is a cross sectional view of a steam dispenser according to an embodiment of the present invention in closed orientation;

FIG. 3A2 is a cross sectional view of a steam dispenser according to an embodiment of the present invention in open orientation;

DETAILED DESCRIPTION OF THE EMBODIMENTS

Throughout the several drawings, the various reference numbers refer consistently to the same respective structural elements.

Figure 1:
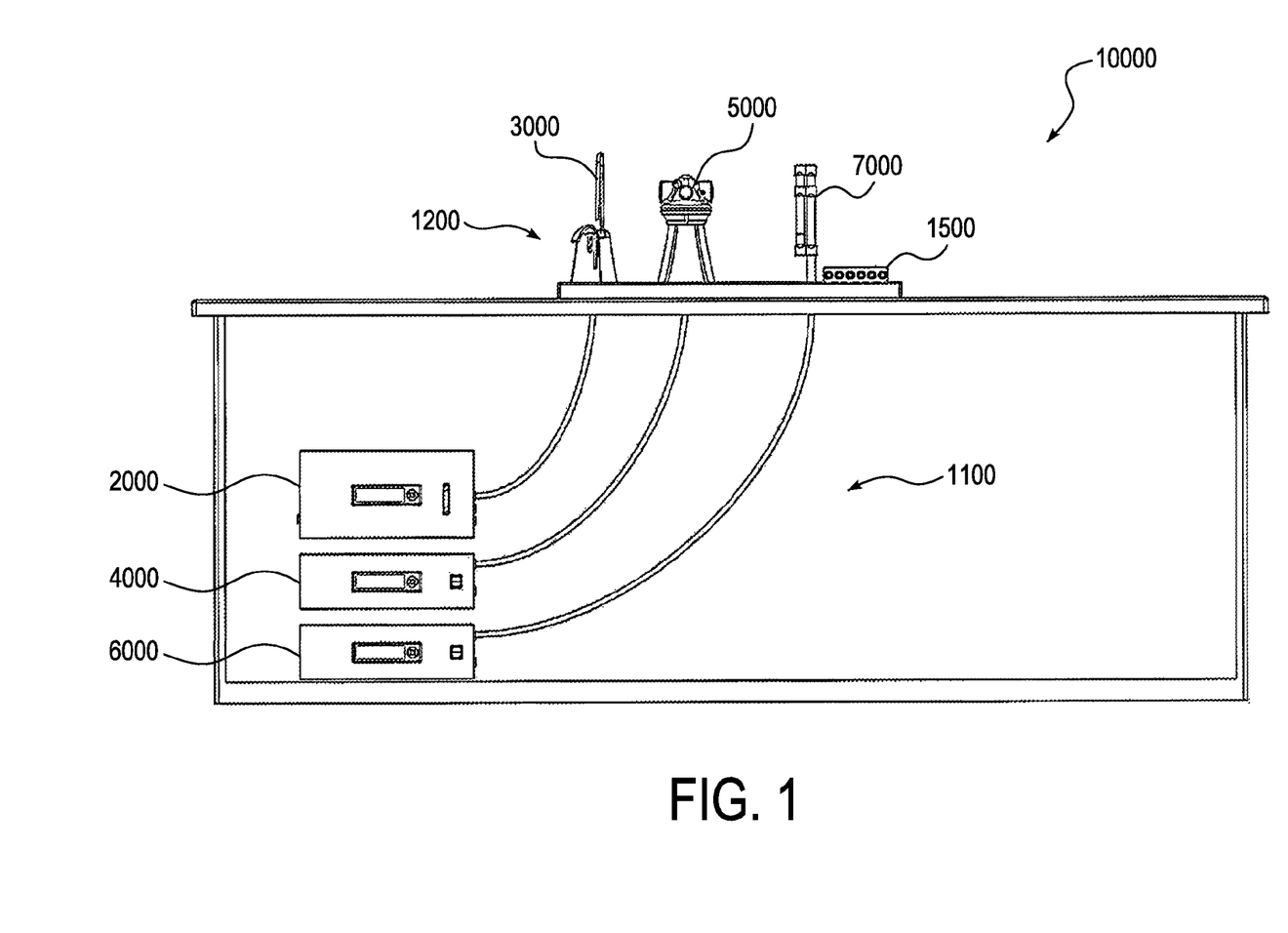
FIG. 1 is a front schematic elevation view of a beverage brewing apparatus according to an embodiment of the present invention.

Referring first to FIG. 1, beverage brewing apparatus 10000 is shown having under counter production unit 1100, comprising: a removable steam producing module 2000, a removable brew module 4000 and, in some embodiments, a removable hot water module 6000, each of which includes electrical and plumbing connections of the type generally known to those of ordinary skill in the art of beverage making and brewing. A water source (not shown) is fluidly connected to the various fluid producing modules 2000, 4000, 6000, and a power source (not shown) is electrically connected to the apparatus 10000 to provide power to electronic components.

Beverage brewing apparatus 10000 further comprises an over counter or dispensing unit 1200. Dispensing unit 1200 may be located on a counter directly above production unit 1100 or relatively remotely therefrom. The so called over counter unit includes control panel 1500, steam dispensing device 3000, brew dispensing device 5000, and hot water dispensing device 7000. Persons of skill in the art will appreciate however that the present system may include multiple controllers 1500 or controllers in any location, such as attached to individual modules, as discussed in further detail below.

The term "removable" is used in the present description and claims to represent the separateness of the modules 2000, 4000 and 6000 from the respective dispensers 3000, 5000, 7000.

Advantageously, due to the under counter arrangement of production modules 2000, 4000 and 6000, the over counter area is almost free and available for other purposes. Therefore, one peculiar feature of the present invention is that the dispensing unit 1200 is remotely arranged with respect to the production modules 2000, 4000 and 6000. For the purposes of the present description and claims, the languages "remote" (as well as "remotely") used in connection with dispensing unit 1200 and production modules will indicate that the dispensing unit 1200 is not in direct contact with production modules. However, the dispensing unit 1200 and the production modules 2000, 4000 and 6000 are connected by tubes or the like to convey the steam, pressurized hot water and hot water to the respective dispensing devices.

The term "remote" is also used to provide separateness of the modules and dispensers. Alternatively to existing coffee equipment, the production unit (module) and dispensing system of the apparatus according to the present invention may be located remotely from each other. Specifically in reference to espresso coffee, it is unique that brewing/dispensing head can be located remotely or at some distance from the heating, pressurizing and control module (production unit).

Finally, the term "modular" as used in the present description and claims refers to an apparatus where the various production modules and/or dispensing devices can be assembled, connected, disconnected, activated, deactivated, and replaced.

Dispensing Unit 1200

As illustrated first in FIG. 1, modular beverage brewing apparatus 10000 comprises dispensing unit 1200. In one embodiment, dispensing unit 1200 comprises steam dispensing device 3000, brew dispensing device 5000, and hot water dispensing device 7000. Each dispensing device is fluidly connected to its corresponding fluid production module, specifically steam producing module 2000, brew producing module 4000, and hot water producing module 6000, respectively.

As further illustrated in FIG. 1, dispensing unit 1200 of modular brewing apparatus 10000 is preferably positioned on a bar top or other convenient location for preparing and serving drinks. In the preferred embodiment of the present invention, steam, brew, and hot water producing modules 2000, 4000, and 6000 are preferably located remotely from dispensing unit 1200, but fluidly connected thereto.

The present system includes a unique communication device that unites and controls all modules in the system.

The communications device performs the function of providing 2-way communication between one or many dispensing, beverage brewing and control apparatuses (i.e., beverage dispensers and beverage producing modules). The purpose of such is to provide a singular control and administration method for these multiple apparatuses disclosed, which allows a potentially large and/or expansive system to be treated as a single and localized system from a system controls and administration respect.

Herebelow a separate description of steam system, brewing system and water system will be given.

Steam System 2000 and 3000

Figure 2:
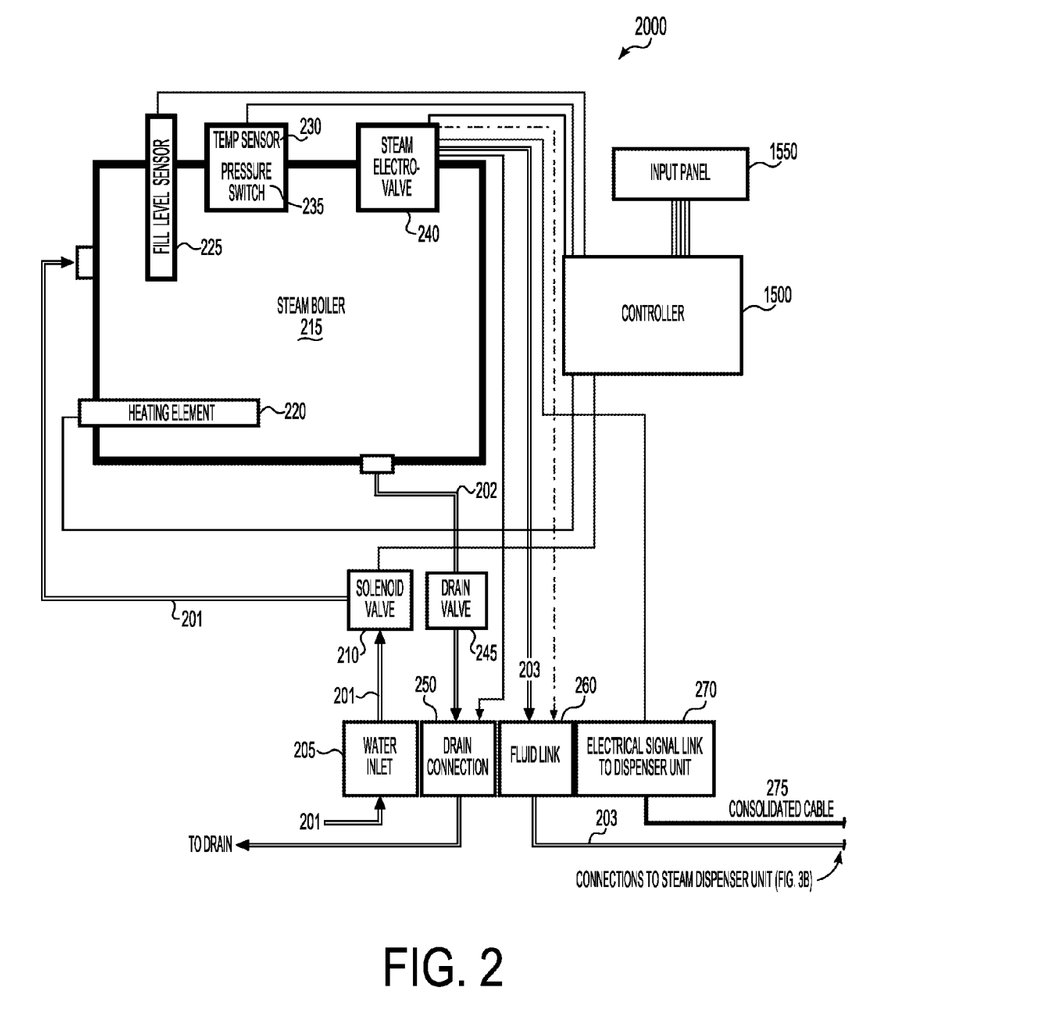
FIG. 2 is a schematic view of a steam producing module according to an embodiment of the present invention.

Turning now to FIG. 2, there is shown a schematic drawing of a steam producing module 2000 according to an embodiment of the present invention. In other embodiments, one or more features and/or components could be missing.

Steam producing module 2000 is electronically connected to controller 1500 via either wireless or wired means. Controller 1500 may be a standard electronic control device as is commonly used in beverage brewing systems and is well known to those of ordinary skill in this art. However, the preferred controller 1500 is a uniquely designed controller designed to accept web connectivity and specifically control the present invention. As will be described in more detail herein, controller 1500 receives input from various temperature, fill level, and other sensors to control the flow and temperature of fluid through and out of steam module 2000.

As shown in the present embodiment, controller 1500 is a single unit that accepts input from a number of unique production modules and provides output instructions to the same. However, it also within the scope of the present invention to provide a unique control unit to each production module.

In addition, control unit 1500 may utilize a remote data source connection providing the ability to modify the software, firmware or other values stored by modules 2000, 4000, and 6000's controller(s) 1500 shall prove advantageous to those skilled in the art. In particular, remote data source connect-ability and modification of the software, firmware or other values stored by modules 2000, 4000, and 6000's controller(s) 1500 could advantageously provide an administrator to change parameters associated with the beverage dispensing, beverage brewing and/or steaming processes to an entire fleet of the modular brewing apparatuses disclosed both simultaneously and from a remote location(s).

Remote data sources as described above may also be an alternative to users of the current invention to input information as previously described through input panel 1550.

Returning to FIG. 2, steam producing module 2000 preferably comprises a solenoid valve 210, a steam boiler 215, a heating element 220, a fill level sensor 225, a temperature sensor 230, a pressure switch 235, a steam electro-valve 240, a drain valve 245, a drain connection 250, a fluid link 260, and fluid paths 201, 202, and 203.

A water inlet 205 is fluidly connected to a water supply (not shown) via fluid path 201. Water inlet 205 is in further fluid connection with solenoid valve 210. Solenoid valve 210 is electronically connected to controller 1500 so that controller 1500 can regulate the flow of water through valve 210 based on inputs from control input panel 1550, as well as temperature sensor 230 and fill level sensor 225 of steam boiler 215, to be discussed below.

Referring still to FIG. 2, water flows from solenoid valve 210 along fluid path 201 to steam boiler 215. Steam boiler 215 generally comprises heating element 220, fill level sensor 225, temperature sensor 230, pressure switch 235, and steam valve 240, all of which are electronically connected to controller 1500. Controller 1500 receives feedback inputs from sensors 225 and 230 and provides control signals to heating element 220. The device described utilizes the inherent relationship between pressure and temperature in a closed vessel such that either pressure switch 235 or temperature sensor 230 can perform the same function via slightly different means.

As further illustrated in FIG. 2, steam boiler 215 is fluidly connected to drain valve 245 via fluid path 202. Excess water from steam boiler 215 is drained through this path. Steam leaves steam boiler 215 through controlled steam electro-valve 240 and out steam path 203 to steam dispenser 3000, illustrated in detail in FIGS. 3a and 3b.

The electro-valve 240 is of the three way type and is located in the steam module 2000. Upon actuation, the steam delivery tube 203 is open to the flow of steam from steam boiler 215, mechanically attached to the electro-valve 240.

Figure 3A:
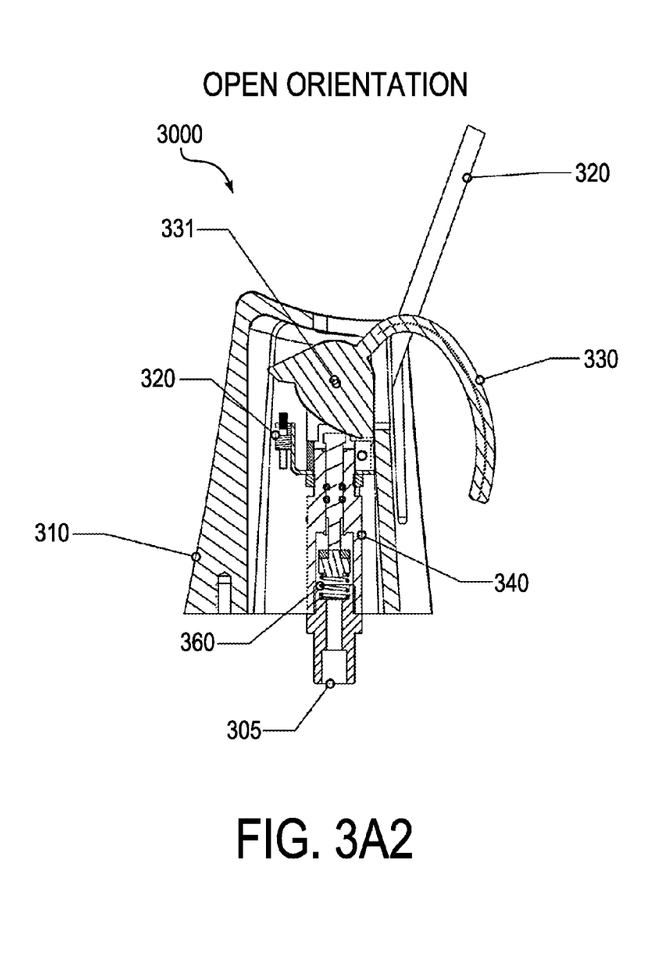
Figure 3A:
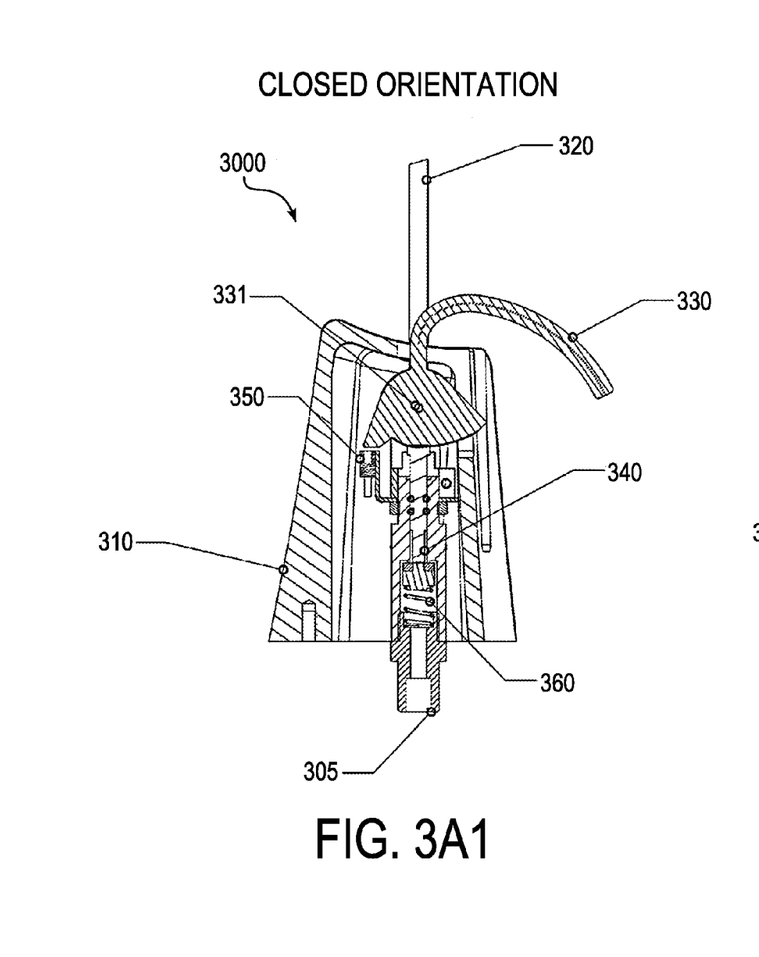

Referring now to FIGS. 3A1, 3A2, and 3B, there is shown steam dispenser 3000 (also referred to as "steam dispensing device") in cross-sectional views and schematic views. Steam dispenser 3000 generally comprises steam channel 305, casing 310, steam wand 320, steam handle 330, needle valve 340, and micro switch 350. As further illustrated in FIGS. 3A1 and 3A2, steam handle 330 rotates about pivot point 331. As steam handle 330 is depressed, the mechanism rotates about pivot point 331 such that needle valve 340 moves against bias spring 360, thereby opening steam channel 305.

Micro switch 350 is in electronic communication with steam electro-valve 240 (FIG. 2) through an electrical signal link 270 and a consolidated cable 275. When open, micro switch 350 instructs steam boiler 215 (FIG. 2) to supply steam to steam dispenser 3000 via a fluid connection tube 203 for flow of steam through steam channel 305 and ultimately out of steam wand 320.

Figure 3B:
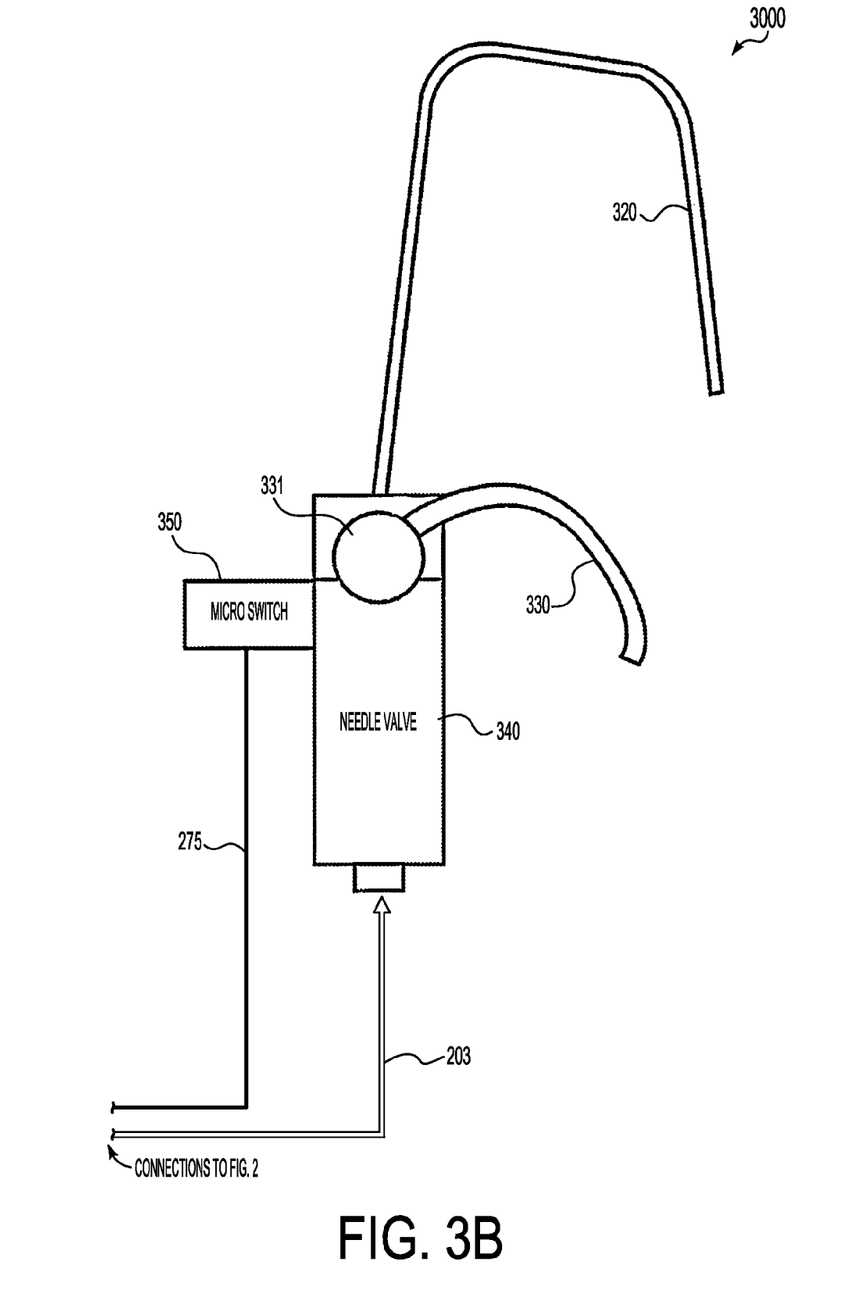
FIG. 3B is a schematic view of a steam dispenser according to an embodiment of the present invention.

The needle valve 340 meters and manages the flow of steam (steam pressure control). Profitably, the nature and benefit of the combination actuation and metering system employed allows for the steam path 203 to be evacuated to drain when in the off or closed position.

The present system advantageously provides steam on an as needed basis to steam dispenser 3000 and ultimately to steam wand 320. Thus, the steam channel 305 is not needlessly saturated when not in use. The present design therefore significantly reduces the need to "purge" the steam line 203 prior to foaming milk for example. This gives users a much better turn-around time for making beverages. The lack of constant line saturation can also provide for improved component life.

Figure 3C:
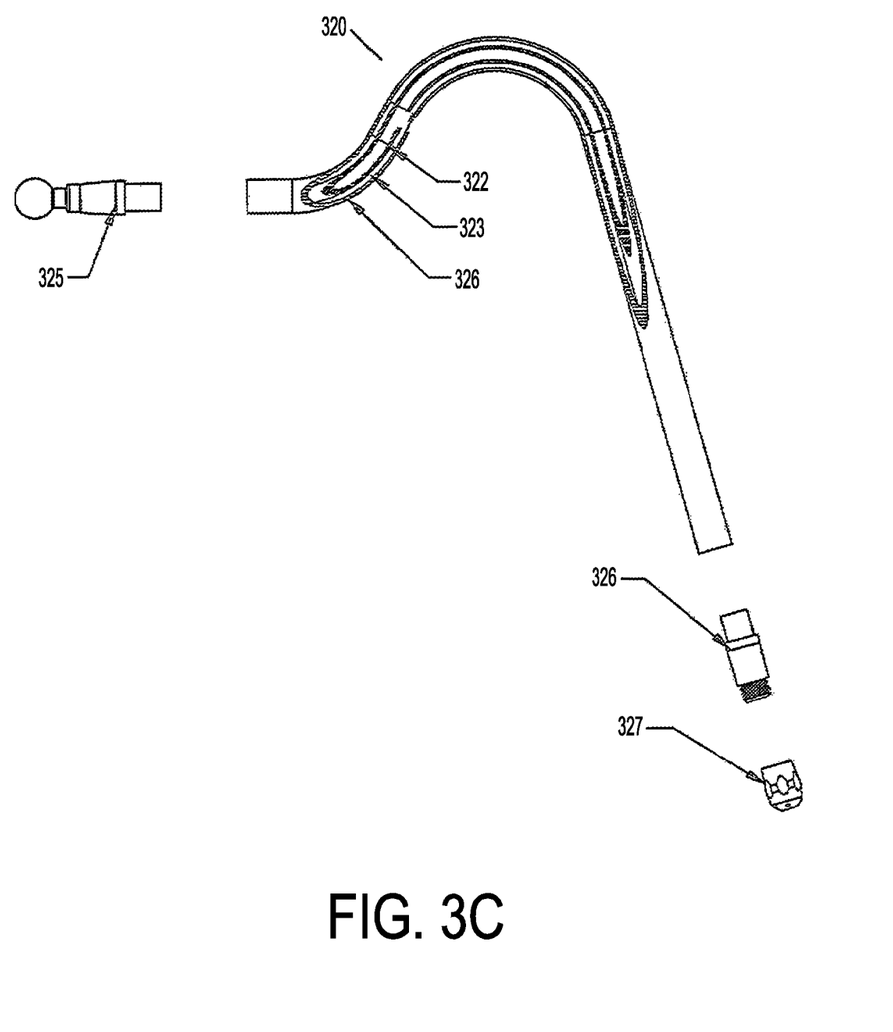
FIG. 3C is a cross sectional view of a steam wand according to an embodiment of the present invention.

FIG. 3C shows a steam wand 320 in cross sectional view according to an embodiment. The steam wand 320 generally comprises outside stainless steel tube 324, inside stainless steel tube 322, insulation material 323, ball adapter fitting 325, steam tip adapter 326 and steam tip 327; when steam flow passes inside the steam wand 320, this particular construction significantly reduces the temperature of the steam wand 320 even in heavy use.

Brewing System 4000 and 5000

Figure 4:
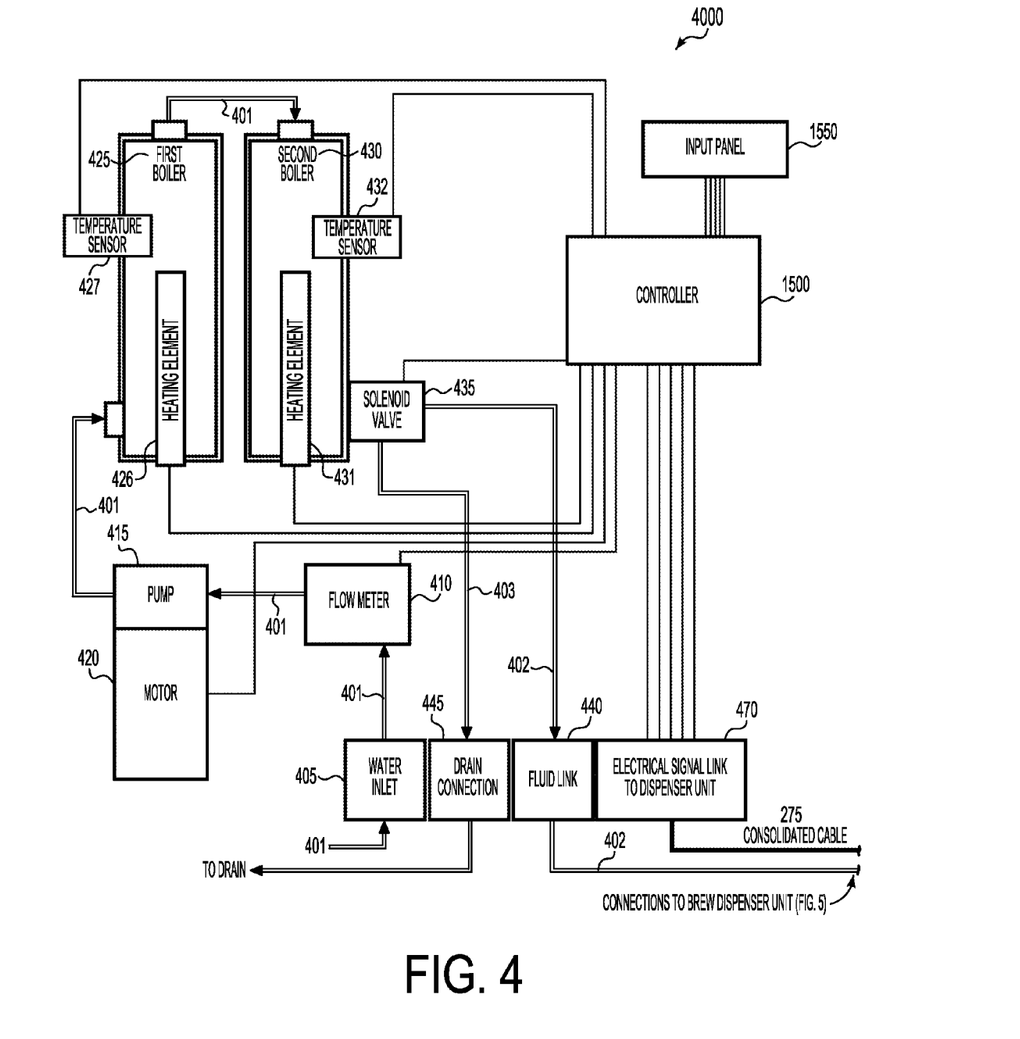
FIG. 4 is a schematic view of a brew producing module according to an embodiment of the present invention.

Referring now to FIG. 4, there is shown a schematic view of brewing module 4000.

Brewing module 4000 controls the flow, temperature, and pressure of water from a water supply to brew head 510 and dispensing point 505 of brew dispenser 5000.

As illustrated in FIG. 4, brewing module 4000 preferably comprises flow meter 410, pump 415, motor 420, first boiler 425, second boiler 430, first heating element 426, second heating element 431, first temperature sensor 427, second temperature sensor 432, solenoid valve 435, and fluid lines 401, 402, and 403.

Water flows from a water supply (not shown) into water inlet 405 through fluid line 401. Water inlet 405 is fluidly connected to the water supply on a first side and to flow meter 410 on a second side.

Flow meter 410 is further fluidly connected to pump 415, which is powered by motor 420. Preferably motor 420 is a brushless magnetic dc motor.

Brewing module 4000 is electrically connected to display and input panel 1550 which is in electronic communication with controller 1500. It will be understood by those of skill in this art that such electronic communication may be wired or wireless. Controller 1500 is further in electronic communication with flow meter 410. Flow meter 410, therefore, provides flow rate information to controller 1500, such that controller 1500 can appropriately control pump 415.

It is within the scope of the present invention to provide a single control unit 1500 for all of the production modules or, alternatively, to provide a unique control unit for each module. Unique control units provide easy replacement of faulty or outdated controllers. While a single control unit provides for easy access and initial installation among other advantages. Similarly, various embodiments may be implemented using one or more display/input units 1550.

Continuing to refer to FIG. 4, there is shown the continued flow of water through fluid line 401 into first boiler 425. Boiler 425 is therefore in fluid communication with pump 415. First boiler 425 comprises first temperature sensor 427, which sensor 427 is also in wired or wireless electronic communication with controller 1500 such that controller 1500 can monitor the temperature of water in boiler 425. First boiler 425 further comprises first heating element 426, which heating element 426 is in wired or wireless electronic communication with controller 1500 such that controller 1500 can be used to adjust the output of first heating element 426.

Referring still to FIG. 4, there is shown the continuation of fluid line 401 as it leaves first boiler 425 to enter second boiler 430. Boiler 430 is therefore in fluid communication with first boiler 425. Second boiler 430 comprises second temperature sensor 432, which sensor 432 is also in wired or wireless electronic communication with controller 1500 such that controller 1500 can monitor the temperature of water in second boiler 430. Second boiler 430 further comprises second heating element 431, which heating element 431 is in wired or wireless electronic communication with controller 1500 such that controller 1500 can be used to adjust the output of second heating element 431.

Thus, users of the apparatus according to the present invention may input a desired output temperature for water into input panel 1550. Said information is electronically communicated to controller 1500. Temperature sensors 427 and 432 from boilers 425 and 430 respectively feedback temperature information to controller 1500, which is in electronic communication with heating elements 426 and 431 of boilers 425 and 430 thereby controlling the temperature of water as it leaves each boiler via each fluid path 402 or 403.

The arrangement with two (or more) separate boilers allows the first boiler to be treated as a pre-heating boiler and the other boiler as a final precision temperature controlled boiler. The algorithm and response characteristics of the control system may be much more aggressive for the first boiler because the purpose is to rapidly raise the water temperature to near set-point, while the second boiler requires a finer tuning and less aggressive control characteristic to provide fine temperature control and accuracy. The first boiler temperature could be, for instance, about 90° C. while the second boiler temperature could be, for instance, 90.2° C.

Referring again to FIG. 4, there is shown three-way solenoid valve 435 which is fluidly connected to boiler 430 and in electronic communication with controller 1500. Controller 1500 regulates flow through solenoid valve 435 such that heated water from boiler 430 can flow through solenoid valve 435 along fluid path 402 to fluid link 440 and on to brew dispenser 5000, described in more detail below. Alternatively, excess water will flow from solenoid valve 435 to drain connection 445 along fluid path 403 and on to a normal drainage system.

As mentioned previously, controller 1500 instructs solenoid valve 435 to distribute a desired amount of heated and pressurized water to flow along fluid path 402 to fluid link 440 and further along fluid path 402 to dispensing unit 5000.

Figure 5:
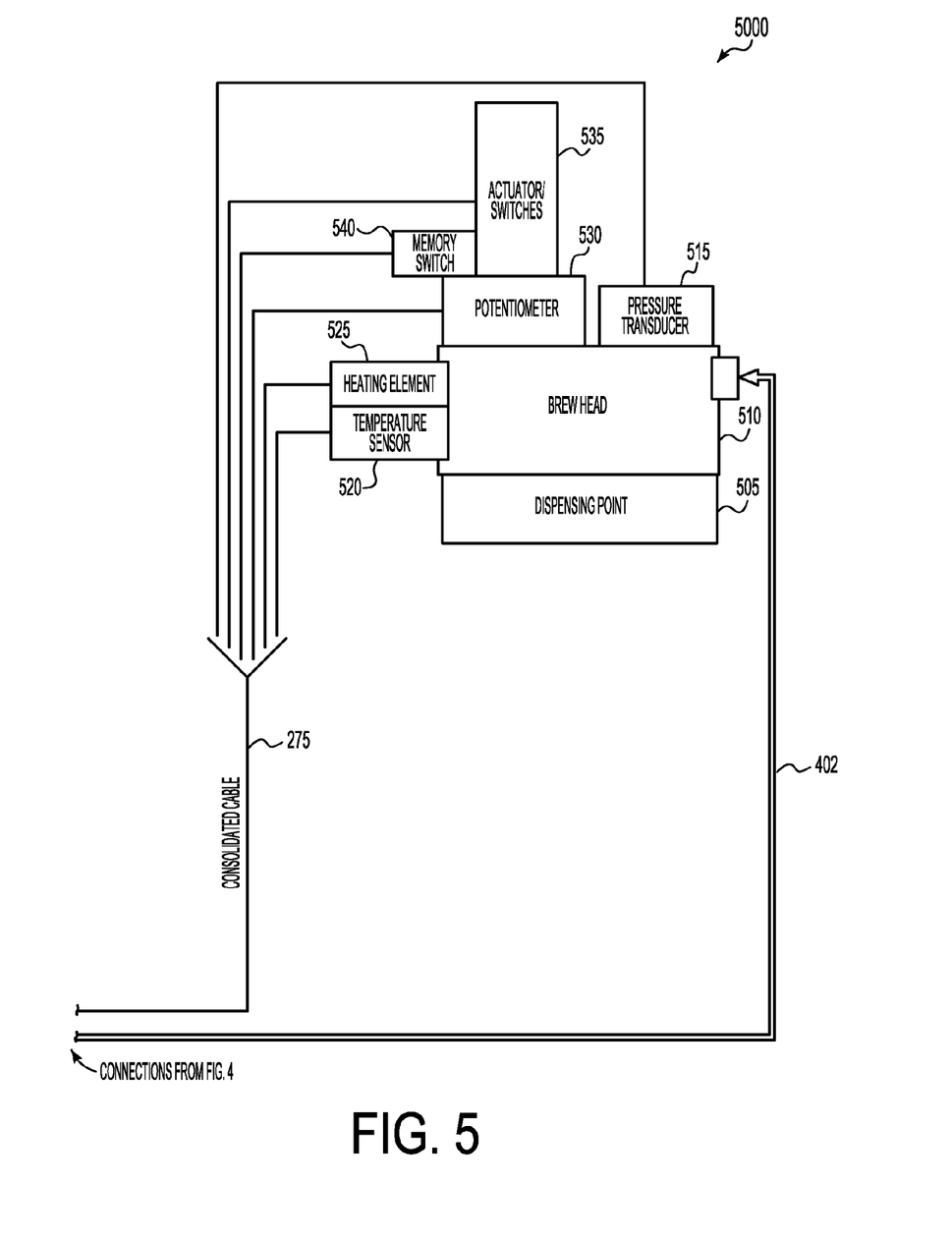
FIG. 5 is a schematic view of a brew dispenser according to an embodiment of the present invention.

Referring now to FIG. 5, there is shown a schematic drawing of an embodiment of brewing dispenser 5000. Brewing dispenser 5000 generally comprises a brew head 510 having a dispensing point 505 fluidly attached thereto. While it is not shown in the figures, a filter holder, possibly provided with a handle and one or more dispensing spouts, can be engaged to the dispensing point 505. Engagement could be by means of a bayonet coupling or other means which is known in the art.

Various embodiments may include means to control the temperature of fluid delivered from brew head 510 to dispensing point 505. Brew head 510 therefore preferably comprises heating element 525 and temperature sensor 520 attached to brewing head 510. Heating element 525 and temperature sensor 520 are further in wireless or wired electronic communication with controller 1500 through an electrical signal link 470 and a consolidated cable 275 such that controller 1500 can further adjust the temperature of water entering brew head 510 and provide fine temperature adjustment directly at brew head 510.

Various embodiments may further include means to control the pressure of fluid delivered from the brewing system to dispensing point 505. Brew head 510 may therefore further comprise pressure transducer 515, potentiometer 530, and actuator/switches 535 in wired or wireless electronic communication with controller 1500 such that controller 1500 can further adjust the pressure of water entering the brew head 510 and provide fine pressure adjustment directly at brew head 510.

Potentiometer 530 is preferably in direct connection to an actuator switch or lever 535 and is in wired or wireless communication with controller 1500 through the electrical signal link 470 and the consolidated cable 275. Controller 1500 receives information from potentiometer 530 and further instructs motor 420 to power pump 415 at a rotation speed in direct relationship to the position of potentiometer 530. This feed-back loop offers a variable and user controllable pressure "profile," which to those understood in the skill of the art will find advantageous to the brewing of coffee beverages, particularly espresso coffee.

Memory switch 540 also is in wired or wireless communication with controller 1500. Memory switch 540, when activated instructs controller 1500 to store values from potentiometer 530 into memory of controller 1500 so that on subsequent cycles by actuation of actuator 535 (which could profitably be a lever), input from potentiometer 530 shall be ignored by controller 1500, in such case controller 1500 shall perform a repeat of the "profile" that was stored in memory.

The ideal pressure range for the brewing of coffee beverages is between approximately 0 PSI and approximately 135 PSI, this shall be referred to as the "operable pressure range".

The potentiometer 530 shall provide position information to controller 1500 which will relate directly to the pressure feed-back loop. The pressure feed-back loop shall compare desired pressure within the operable pressure range to actual pressure, which is provided to the feedback loop by pressure transducer 515. In the case that a desired pressure within the operable pressure range is unavailable due to a system supply pressure in excess of said desired pressure, the system shall respond by reversing the direction of motor 420, thus reversing the rotation of pump 415 (this is to be referred to as "attenuation") to provide attenuation to the actual pressure as reported by pressure transducer 515 to the desired pressure provided by user input or memory information stored in controller 1500.

The addition of attenuation to the brewing system shall prove advantageous to those skilled in the art. In particular, attenuation advantageously allows for brewing pressures to be lower (as low as 0 (zero) PSI) than the supply pressure provided by the water supply (not shown) in direct fluid connection to water inlet 205.

It should be understood by the reader that steam module 2000, brewing module 4000 and water producing module 6000 may all be in either wireless or wired electronic communication with an external data source; such as computer, hard disk, portable flash memory device, router or other path or means to a data source. The data source may be modified by an operator or administrator to provide firmware and/or software information to controller 1500 of said modules 2000, 4000 and/or 6000. The many modules of 2000, 4000 and/or 6000 containing controllers 1500 may be modified by external data source simultaneously regardless of location or number of instances of modules 2000, 4000 and 6000 in existence.

Water System 6000, 7000

Figure 6:
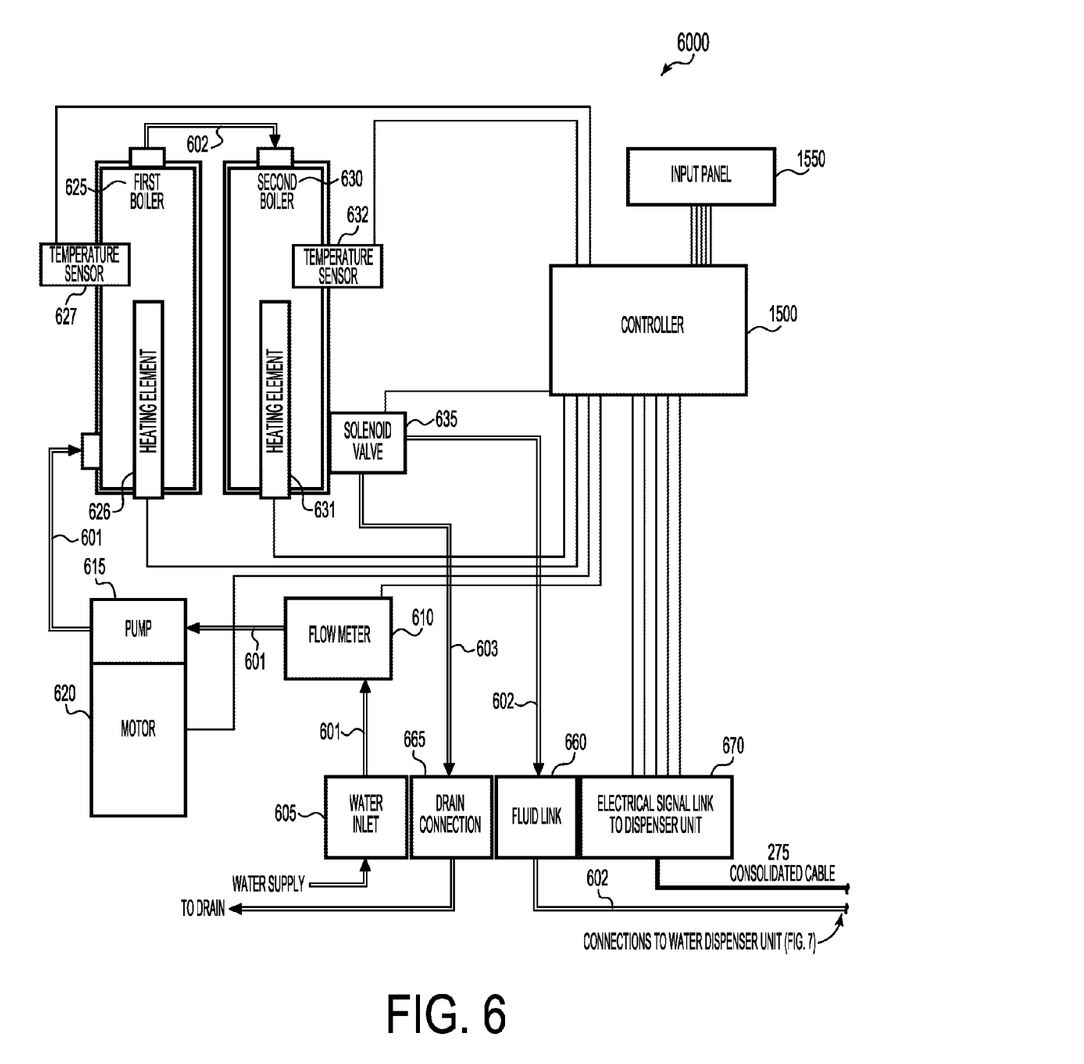
FIG. 6 is a schematic view of a hot water producing module according to an embodiment of the present invention.

Referring now to FIG. 6, there is shown a schematic view of water module 6000. Water module 6000 controls the flow, temperature, and pressure of water from a water supply to water dispenser 7000.

As illustrated in FIG. 6, water module 6000 preferably comprises flow meter 610, pump 615, motor 620, first boiler 625, second boiler 630, heating elements 626 and 631, temperature sensors 627, 632, solenoid valve 635, and fluid lines 601, 602, 603.

As illustrated in FIG. 6, water flows from a water supply (not shown) into water inlet 605 through fluid line 601. Water inlet 605 is fluidly connected to the water supply on a first side and to flow meter 610 on a second side. Flow meter 610 is further fluidly connected to pump 615, which is powered by motor 620. Preferably, motor 620 is a brushless magnetic dc motor.

Water module 6000 is electrically connected to display and input panel 1550 which is in electronic communication with controller 1500. It will be understood by those of skill in this art that such electronic communication may be wired or wireless. Controller 1500 is further in electronic communication with flow meter 610. Flow meter 610 provides information to controller 1500 such that controller 1500 can regulate pump 615 of brew module 6000.

As previously stated, it is within the scope of the present invention to provide a single control unit for all of the production modules or, alternatively, to provide a unique control unit for each module. Unique control units provide easy replacement of faulty or outdated controllers. While a single control unit provides for easy access and initial installation among other advantages. Similarly, various embodiments may be implemented using one or more display/input units.

Continuing to refer to FIG. 6, there is shown the continued flow of water through fluid line 601 into a first boiler 625. First boiler 625 is therefore in fluid communication with pump 615. First boiler 625 comprises temperature sensor 627 which sensor 627 is also in wired or wireless electronic communication with controller 1500 such that controller 1500 can monitor the temperature of water in first boiler 625. First boiler 625 further comprises heating element 626 which heating element 626 is in wired or wireless electronic communication with controller 1500, such that controller 1500 can be used to adjust the output of heating element 626.

Referring still to FIG. 6, there is shown the continuation of fluid line 601 as it leaves first boiler 625 to enter second boiler 630. Second boiler 630 is therefore in fluid communication with first boiler 625. Second boiler 630 comprises temperature sensor 632 which sensor 632 is also in wired or wireless electronic communication with controller 1500 such that controller 1500 can monitor the temperature of water in second boiler 630. Second boiler 630 further comprises heating element 631 which heating element 631 is in wired or wireless electronic communication with controller 1500, such that controller 1500 can be used to adjust the output of heating element 631.

Thus, users of the apparatus according to various embodiments may input a desired output temperature for water into input panel 1550. Said information is electronically communicated to controller 1500. Temperature sensors 627 and 632 from boiler 625 and 630 respectively feedback temperature information to controller 1500, which is in electronic communication with heating elements 626 and 631 of boilers 625 and 630 thereby controlling the temperature of water as it leaves each boiler via each fluid path 602 or 603.

Referring again to FIG. 6, there is shown three-way solenoid valve 635 which is fluidly connected to second boiler 630 and in electronic communication with controller 1500. Controller 1500 regulates flow through solenoid valve 635 such that heated water from second boiler 630 can flow through solenoid valve 635 along fluid path 602 to fluid link 660 and on to water dispenser 7000, described in more detail below. Alternatively, excess water will flow from solenoid valve 635 to drain connection 665 along fluid path 603 and on to a normal drainage system.

As mentioned previously, controller 1500 instructs solenoid valve 635 to distribute a desired amount of heated and pressurized water to flow along fluid path 602 to fluid link 660 and further along fluid path 602 to dispensing unit 7000.

Figure 7:
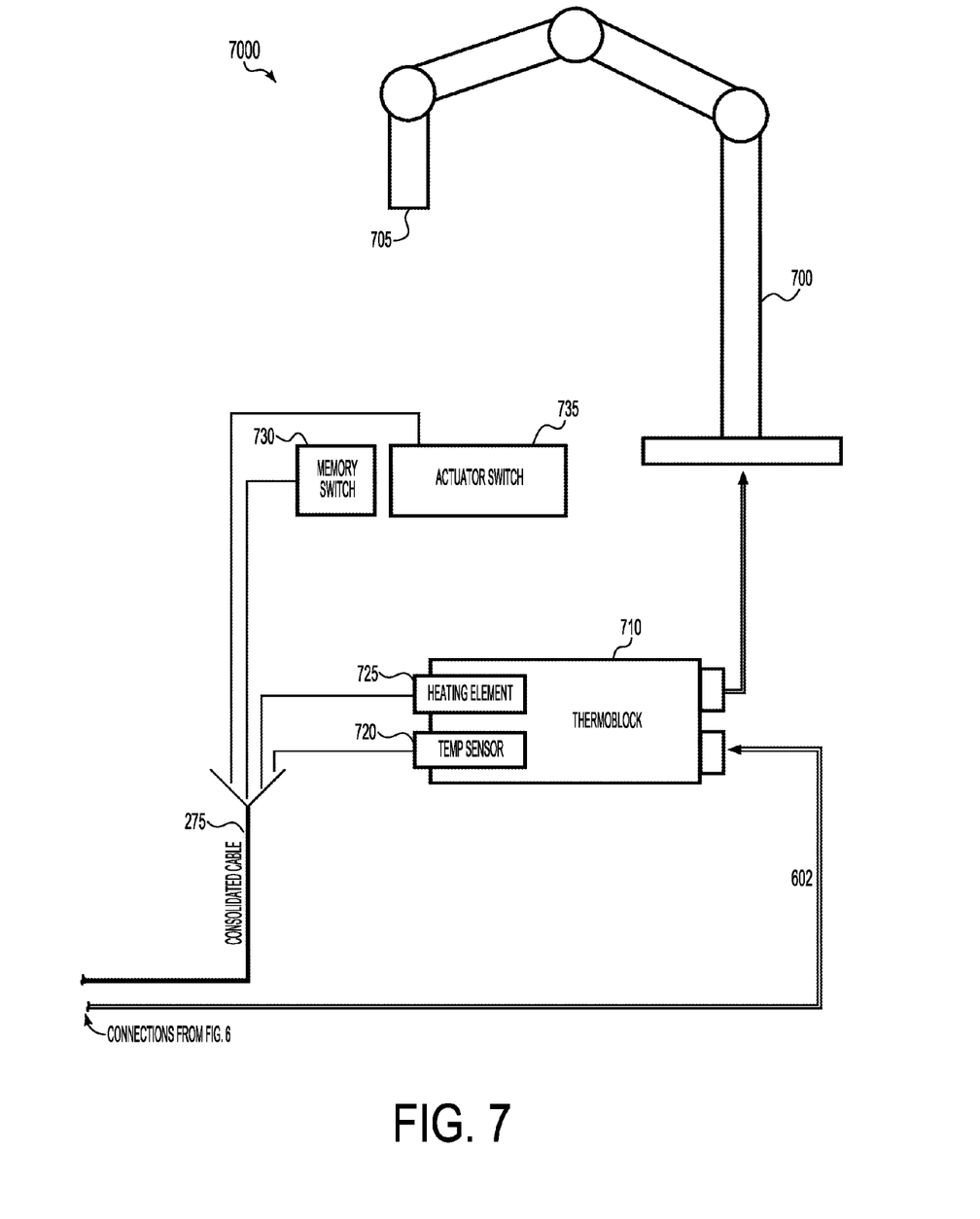
FIG. 7 is a schematic view of a hot water dispenser according to an embodiment of the present invention.

Referring now to FIG. 7, there is shown a schematic drawing of water dispensing device 7000. Water dispensing device 7000 generally comprises a thermoblock 710 and water dispensing point (faucet or water wand) 705 fluidly attached thereto.

Thermoblock 710 may comprise a solid mass of metal (stainless steel) which is heated by electrical heat elements. Water flows through fluid ports in the block, the purpose being to maintain temperature so as to not lose temperature to an unheated brewing head 700. Thermoblock 710 performs like a combination of heating vessel and mechanical interface and support for other parts.

The present invention comprises means to control the temperature of fluid delivered from thermoblock 710 to dispensing point 705. Thermoblock 710 therefore comprises heating element 725 and temperature sensor 720 attached to thermoblock 710. Heating element 725 and temperature sensor 720 are further in wireless or wired electronic communication with controller 1500 through an electrical signal link 670 and a consolidated cable 275 such that controller 1500 can further adjust the temperature of water entering thermoblock 710 and provide fine temperature adjustment directly at water dispensing point 705.

Various embodiments further include means to control the flow rate, pressure, and volume of fluid delivered from water module 6000 to water dispensing point 705. Water dispensing device 7000 further comprises actuator switch 735 and memory switch 730 in wired or wireless communication with controller 1500 such that controller 1500 can further adjust the flow rate, pressure, and volume of water entering the thermoblock 710 and subsequently water dispensing point 705.

Memory switch 730 being in wired or wireless communication with controller 1500 shall provide a means for storing operator controlled dispensing cycles which are triggered by actuator switch 735; this storing of dispensing cycle information shall be referred to as "learning". Memory switch 730, when activated, instructs controller 1500 to store flow rate and water volume information from flowmeter 610 into the memory of controller 1500 so that on subsequent cycles, by the triggering of actuation switch 735, the values stored for flow rate and water volume information shall be used to perform a repeat of the "profile" which was stored (learned) in the memory of controller 1500.

Learning Control System (FIGS. 6 and 8)

This "learning" function advantageously provides repeatability of water flow rate, pressure and volume to a fine degree of accuracy for each cycle triggered by the operator, thus producing a higher level of consistency in the beverage dispensing process.

In addition, controller 1500 which is in wireless or wired electronic communication with motor 620 and in wireless or wired electrical communication with temperature sensors 627 and 632, may further comprise a feed-back loop. Thus, based on the information received from temperature sensors 627 and 632, controller 1500 may increase or decrease the speed of pump 615 (or other fluid manipulations devices, such as heaters and the like) by varying the voltage output to motor 620 for the purpose of more accurately achieving the desired output temperature for water as input by the user(s) of the current invention via input panel 1550. By increasing or decreasing the flow rate and/or pressure of water through boilers 625 and 630, the performance of heating elements 626 and 631 will be affected.

The learning system consists of at least one control switch or actuator in electrical connection with controller 1500 for starting and/or stopping a beverage making process and at least one memory switch in electrical connection with controller 1500 for instructing controller 1500 to begin memorizing a process.

When memory switch is activated, controller 1500 is instructed to memorize parameters and feedback from various sensors over time, including but not limited to: temperature sensors, pressure sensors, solenoid valve(s) status (position, open or closed), flow meter count/pulse or total, pump speed, motor voltage, etc. The logging of this information by controller 1500 shall begin when after activating said memory switch one of the one or more control switch/actuators is activated. When the control switch/actuator is deactivated, either by means of physically pressing the switch/actuator or by another means of wired or wireless communication with said control switch/actuator, the logging of information by controller shall stop. This information is stored by controller 1500 and used to perform a recall of the memory and repeat the conditions which were logged and stored during the memory cycle on demand when a control switch/actuator is activated on subsequent operational cycles.

The learning function of the beverage making device simplifies the programming of the machine while providing for a high level of repeatability, yielding more consistent beverage quality.

It should be understood that the above description is included for illustrative purposes only, and it is not meant to be limiting of the invention. A person skilled in the art will understand that variations of this invention are included within the scope of the claims herein.

We claim:

1. A beverage making and dispensing apparatus, comprising:
    a first module comprising a hot water heating element, the first module connectable to a water supply and a power source for producing hot water;
    a second module connectable to the water supply and the power source for producing pressurized hot water, the second module comprising:
        a pressurized hot water electronic control device;
        a first water boiler in fluid communication with the water supply;
        a first temperature sensor associated with the first water boiler, the first temperature sensor electrically connected to the pressurized hot water electronic control device;
        a first heating element configured to heat water from the water supply within the first water boiler to a first target temperature, the first heating element electrically connected to the pressurized hot water electronic control device;
        a second water boiler in fluid communication with the first water boiler;
        a second temperature sensor associated with the second water boiler, the second temperature sensor electrically connected to the pressurized hot water electronic control device; and
        a second heating element configured to heat water received from the first water boiler within the second water boiler to a second target temperature, the second heating element electrically connected to the pressurized hot water electronic control device; and
    a third module comprising at least one steam heating element, the third module connectable to the water supply and the power source for producing steam;
    wherein each module is fluidly connectable to a remote dispensing unit; and
    wherein the remote dispensing unit is removably connectable to each of the modules, and wherein the remote dispensing unit is configured to be located above a counter surface and the first, second, and third modules are configured to be located below the counter surface, the remote dispensing unit comprising:
        a hot water delivery device fluidly connectable to the first module;
        a pressurized hot water delivery device fluidly connectable to the second module, the pressurized hot water delivery device comprising:
            a brew head having a dispenser portion;
            a third temperature sensor associated with the brew head, the third temperature sensor electrically connected to the pressurized hot water electronic control device;
            a third heating element attached to the brew head, the third heating element configured to heat water received from the second water boiler at the dispenser portion to a third target temperature, the third heating element electrically connected to the pressurized hot water electronic control device; and
        a steam delivery device fluidly connectable to the third module,
        wherein each module is removable from the remote dispensing unit without affecting operation of the other modules.

2. The beverage apparatus of claim 1, further comprising a hot water electronic control device in electronic communication with said first module, a steam electronic control device in electronic communication with the third module, and at least one electronic input device in electronic communication with said hot water electronic control device, the pressurized hot water electronic control device, and the steam electronic control device, wherein the hot water electronic control device accepts input from the electronic input device and provides output instructions to the first module, wherein the pressurized hot water electronic control device accepts input from the electronic input device and provides output instructions to the second module, and wherein the steam electronic control device accepts input from the electronic input device and provides output instructions to the third module.

3. The beverage apparatus of claim 2, wherein said third module comprises a water inlet, a solenoid valve, a steam boiler, a steam temperature sensor, and a fill level sensor, wherein said water inlet is in fluid connection with said solenoid valve, wherein said solenoid valve is electronically connected to said steam electronic control device so that said steam electronic control device can regulate a flow of water through said solenoid valve based on inputs from said electronic input device, said steam temperature sensor, and said fill level sensor.

4. The beverage apparatus of claim 3, wherein said steam electronic control device receives feedback inputs from said fill level sensor and said steam temperature sensor and provides control signals to said steam heating element.

5. The beverage apparatus of claim 4, further comprising a steam valve which is electronically connected to said steam electronic control device, wherein said steam valve is of the three-way type, wherein upon actuation of said steam valve a steam delivery tube is open to a flow of steam from said steam boiler.

6. The beverage apparatus of claim 5, further comprising a micro switch in electronic communication with said steam valve, wherein when open, said micro switch causes said steam boiler to supply steam to said steam delivery device via the steam delivery tube for flow of steam through a steam channel and out of a steam wand.

7. The beverage apparatus of claim 6, wherein said fluid connection tube has a first end attached to the steam valve and a second end attached to a mechanically controlled needle valve, wherein the apparatus further comprises means to open the mechanically controlled needle valve and activate a switch, and further comprises an outlet port fluidly connected to said mechanically controlled needle valve.

8. The beverage apparatus of claim 1, wherein said steam delivery device comprises a steam wand, wherein said steam wand comprises an inner tube in communication with a steam path, a secondary outer tube which is not in communication with said steam path so that a separation of space is provided between said inner and outer tubes, and an insulating material placed between the inner tube and the outer tube.

9. The beverage apparatus of claim 2, wherein the second module further comprises a flow meter, a pump, a motor, and a solenoid valve, wherein said second module is electrically connected to said electronic input device.

10. The beverage apparatus of claim 9, wherein said pressurized hot water electronic control device is further in electronic communication with said flow meter so that said flow meter provides flow rate information to said pressurized hot water electronic control device, wherein said pressurized hot water electronic control device uses said flow rate information to control said pump.

11. The beverage apparatus of claim 10, wherein said electronic input device is configured to accept a desired output temperature for water, wherein said first temperature sensor from said first water boiler, said second temperature sensor from said second water boiler, and said third temperature sensor from said brew head provide feedback temperature information to said pressurized hot water electronic control device, which is in electronic communication with said first heating element, said second heating element, and said third heating element.

12. The beverage apparatus of claim 1, wherein said third heating element and third temperature sensor are configured such that said pressurized hot water electronic control device can further adjust the third target temperature of water exiting the dispensing point of said brew head to provide fine temperature adjustment directly at said brew head.

13. The beverage apparatus of claim 12, wherein said pressurized hot water delivery device comprises means to control the pressure of fluid delivered from said second module to said dispensing point, wherein said brew head further comprises a pressure transducer, a potentiometer, and an actuator-switch in wired or wireless electronic communication with said pressurized hot water electronic control device such that said pressurized hot water electronic control device can further adjust the pressure of water entering the brew head to provide fine pressure adjustment directly at said brew head.

14. The beverage apparatus of claim 13, wherein said potentiometer is in direct connection to said actuator switch or a lever and is in wired or wireless communication with said pressurized hot water electronic control device, wherein said pressurized hot water electronic control device receives information from said potentiometer and further instructs said motor to power said pump at a rotation speed in direct relationship to information received from said potentiometer so that a feedback loop is provided.

15. The beverage making and dispensing apparatus of claim 1, further comprising at least one electronic input device in electronic communication with the pressurized hot water electronic control device, the electronic input device configured to accept input from a user and communicate the input from the user to the pressurized hot water electronic control device, wherein the pressurized hot water electronic control device is configured to communicate output instructions to the second module such that the second module selectively controls the temperature and pressure of water exiting an outlet of the brew head based on the output instructions.

16. The beverage making and dispensing apparatus of claim 2, wherein the electronic input device is located at the brew head.

\* \* \* \* \*